United States Patent [11] 3,580,378

| [72] | Inventor | Erik J. Pedersen<br>1875 Conn. Ave. N.W. Suite 1205,<br>Bethesda, Md. 20009 |
|---|---|---|
| [21] | Appl. No. | 775,682 |
| [22] | Filed | Nov. 14, 1968 |
| [45] | Patented | May 25, 1971 |

[54] AUTOMATIC HANGER DISCHARGE
9 Claims, 4 Drawing Figs.

[52] U.S. Cl. .................................................. 198/25, 198/38
[51] Int. Cl. .................................................. B65g 47/61, B65g 47/36, B65g 47/46
[50] Field of Search .......................................... 198/25, 42, 38, 169, 103, 26

[56] References Cited
UNITED STATES PATENTS

| 1,892,670 | 1/1933 | Jaeger | 198/103 |
| 2,998,136 | 8/1961 | Gerish | 198/42X |
| 3,006,453 | 10/1961 | Tonelli | 198/25 |
| 3,124,236 | 3/1964 | Gerish | 198/169 |

*Primary Examiner*—Robert G. Sheridan
*Attorney*—Littlepage, Quaintance, Wray and Aisenberg ABSTRACT: Hangers such as conventional coat hangers are suspended from a rod carried by a first conveyor. An end of a second conveyor having a toothed rotary transfer element and a guide means is swung into position along the rod. The guide means aligns the hangers on the pipe so that they may be engaged by the teeth of the transfer. As the transfer rotates, it lifts the hangers one at a time from the rod and deposits the hangers on a continuously moving band which is exposed along an upper surface of the second conveyor. The band carries the hangers along the second conveyor and drives the rotary transfer element.

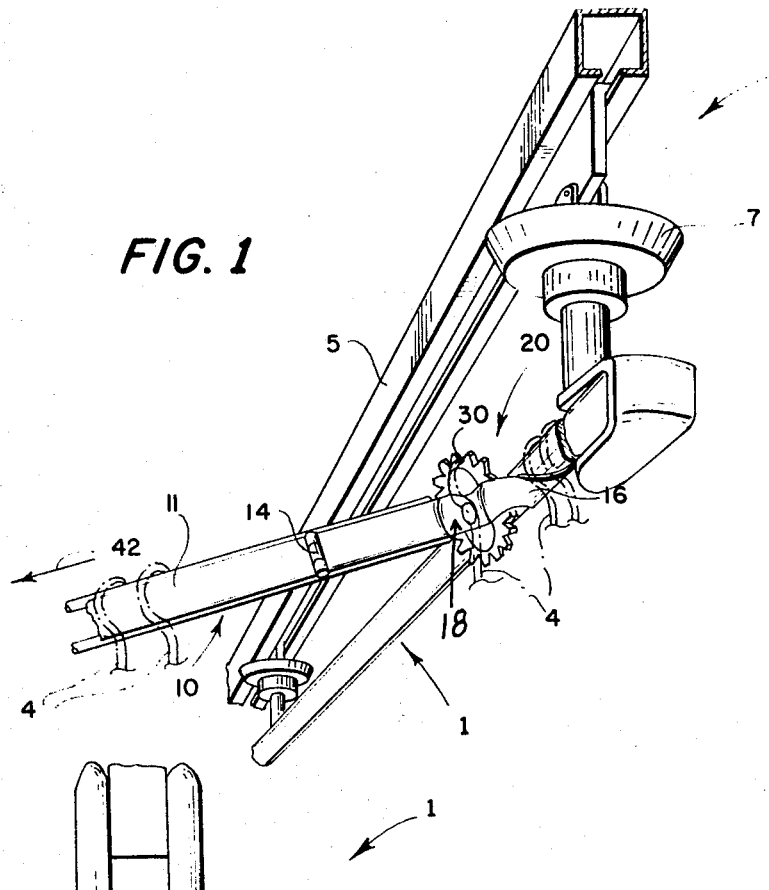
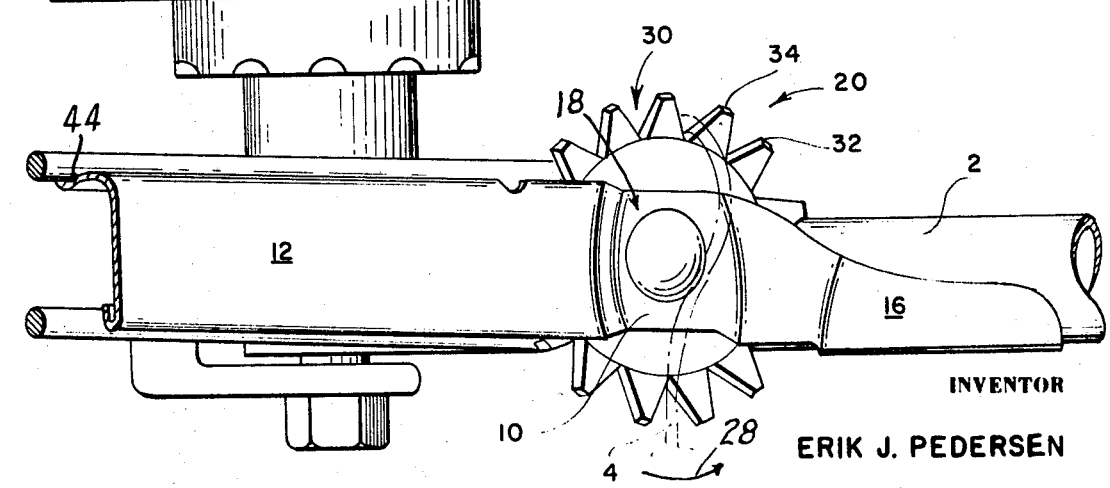

INVENTOR
ERIK J. PEDERSEN

AUTOMATIC HANGER DISCHARGE

BACKGROUND OF THE INVENTION

Materials-handling systems for warehousing and plant operations are well developed. In many materials-handling operations goods are connected to conveyors by hangers which are suspended from the conveyors. While the transfer of carriers containing goods on hangers throughout a warehouse or plant is facilitated by varied material-handling applications, the removal of hangers from the carriers by automatic means presents a problem which has not been fully solved.

Materials-handling systems have several forms. Carriers may be directly attached to drive chains or carriers may move along separate rails and may be selectively engaged and driven by continuously moving elements. In most applications, it is convenient to suspend goods on hangers which are detachable from the carriers.

The present invention is described using an example of a power-and-free conveyor system in which goods are suspended from a free carrier by conventional hangers. This invention includes and has utility and application in which hangers might be suspended from a moving continuous element or from carriers directly connected to a continuously moving element. Thus, conveyor or conveyor means throughout the application is used in its broadest sense of an apparatus for moving articles.

The present invention is described by referral to a specific example in which goods are supported on conventional coat hangers. The invention includes and has application in systems in which goods are supported on specially designed hangers and in which several hangers may be innerconnected, as well as in systems in which goods may be directly supported on carriers. Thus, as used herein, the term hanger includes all devices which severally are supported on a conveyor or carrier, which devices include conventional and specially designed hangers as well as articles or goods themselves.

SUMMARY OF THE INVENTION

The objectives of this invention are accomplished by a device which is selectively positionable adjacent a moving conveyor for aligning hangers on the conveyor, which engages and lifts hangers from the first conveyor, and which lowers the hangers onto a second continuously moving conveyor.

One embodiment of an apparatus which is useful to accomplish the objectives of this invention is a carrier having a horizontal bar which is driven past a hanger discharge station. Goods, in this case clothing, are supported on the bar by conventional clothes hangers. Each carrier is identified by an identification means which is readable by a detector adjacent the track. When similar identifications have been programmed into the identification means on the carrier and the detector adjacent the track, an arm is swung toward the bar of the carrier. The hinged arm is a frame which supports one end of a second conveyor and a transfer apparatus at the extreme end of the second conveyor. Beyond the transfer apparatus there is extended a guide means which may contact the bar of the first conveyor to insure accurate positioning of the two conveyors and transfer apparatus, and to insure that all hangers on the bar are stripped therefrom and are transferred to the second conveyor.

The objectives of this invention may be accomplished by a suitable transfer apparatus which lifts the hangers from the first conveyor or bar, carries the hangers to a position above the second conveyor and lowers the hangers to the second conveyor. The transfer apparatus described herein is a rotating wheel which has hanger-engaging teeth. In one convenient form the transfer apparatus or toothed wheel is driven by the same continuous member which moves hangers along the second conveyor.

The continuous member of a preferred embodiment of the second conveyor is a rubber belt which passes around a pulley portion of a toothed wheel to drive the wheel. The upper rung of the belt exposes the belt so that hangers resting along the belt move along the conveyor with the belt.

The frame of the second conveyor is hinged so that an end of the conveyor may be swung toward and away from the first conveyor. In a preferred embodiment, each frame portion comprises a unitary piece having a trough bent in its upper edge to support the continuous belt positioned in the trough and exposed above the frame. The bottom edge of the frame is bent upon itself to form a smooth edge, and the bottom portion of the belt is allowed to run free from the frame. An area near the free end of the frame is constricted and recessed to rotatably receive the transfer or hanger-lifting wheel. The frame continues beyond the wheel mounting portion and is bent and curved to form the guide which engages the bar of the first conveyor.

The hanger lifting wheel is composed of two axial parts. A first axial part of the wheel which is remote from the frame forms a pulley about which the belt is passed. The second axial portion of the wheel is toothed. The teeth are slanted away from a radial direction of the wheel so that they are substantially parallel to the first conveyor to aid in the lifting of hangers therefrom. The root diameter of the teeth substantially exceeds the diameter of the pulley so that the hangers are raised above the belt and then lowered to the belt. Base portions of the forward surfaces of the teeth in the sense of rotation of the wheel are concave so that hangers do not slip off the teeth as the hangers are lifted from the bar of the first conveyor. Outer edges of the forward faces of the teeth are convex to aid in the movements of the hangers away from the teeth by the second conveyor.

In the method of the present invention, the presence of a preselected carrier and a discharge station is sensed by a code detector. The detector causes the free end of the second conveyor to be swung toward the first conveyor. The first conveyor moves with respect to the second conveyor causing hangers on the first conveyor to be brought into contact with the guide on the free end of the second conveyor. The guide aligns hangers on the first conveyors so that they will be engaged by teeth of a rotary transfer element. The transfer element lifts the hangers from the first conveyor, carries the hangers from the first conveyor to a position over a continuously moving belt, and lowers the hangers onto the continuously moving belt. As the approach of the end of the carrier is sensed, the free end of the second conveyor is moved away from the first conveyor.

While in the preferred embodiment, the second conveyor is hinged whereby it is juxtapositioned to carriers of the first conveyor, it will be appreciated that track of the first conveyor may be designed to selectively juxtaposition a carrier of the first conveyor with respect to a fixed second conveyor. Although the example shows the lifting of hangers from a bar, it will be appreciated that the same apparatus may withdraw hangers from the hanger-receiving apertures in carriers or conveyors.

This invention has as one objective the provision of hanger discharge apparatus which lifts hangers from a first conveyor and transfers the hangers to a second conveyor.

Another objective of this invention is the provision of hanger discharge apparatus comprising a frame positionable adjacent a first conveyor, a frame having a guide means for positioning next to the carrier of a first conveyor, to align hangers thereon, a rotary transfer apparatus adjacent the guide means for lifting hangers from the carrier and a continuously moving belt for driving the rotary transfer element and for carrying hangers away from the transfer.

A further objective of this invention is the provision of a method for discharging hangers from a carrier including the steps of positioning a guide adjacent the carrier, lifting hangers from the carrier, moving hangers over a second conveyor, lowering hangers onto the second conveyor and driving the lifting and lowering means by the second conveyor.

Further objectives of this invention will be apparent from the specification, which includes the claims, and from the drawings.

BRIEF DESCRIPTION OF THE DRAWINGS

FIG. 1 is a perspective detail of hanger discharge apparatus of this invention.

FIG. 2 is a side elevation detail of the discharge apparatus of this invention.

DETAILED DESCRIPTION OF THE DRAWINGS

Figure 3:
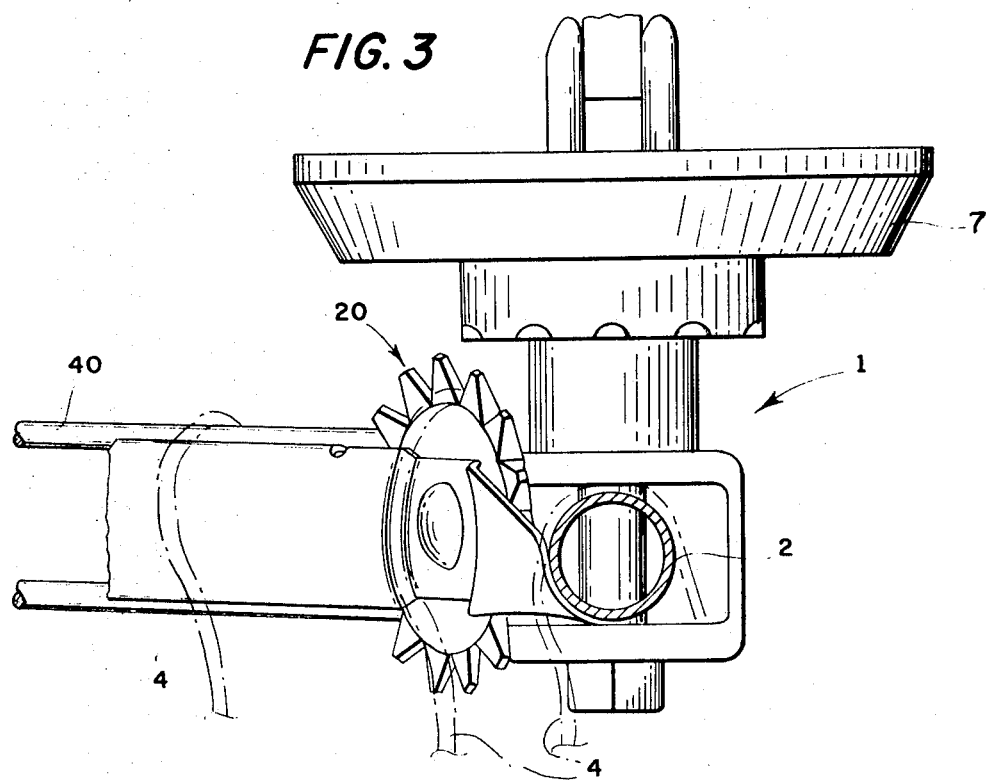
FIG. 3 is an end elevation detail of the discharge apparatus.

Referring to the drawings, a carrier is generally indicated by the numeral 1. A bar 2 forms a portion of carrier 1, and mounted on the bar are hangers 4. Carrier 1 is part of a power-and-free conveyor system in which carriers 1 move along track 5 propelled by a pushing means from a chain in a parallel chain run, not shown. The carrier contains identifying code means 7 having reflective patches which are readable by light sources and photocells in detectors above the track.

A second conveyor generally indicated by the numeral 10 is mounted at a discharge station along the first conveyor. Second conveyor 10 has a frame which consists of a first stationary portion 11 and a second swingable portion 12, which are joined by hinge 14. The end of frame 12 which is remote from stationary frame 11 forms a guide portion 16 which lies against the bar 2 of carrier 1. Intermediate guide 16 and hinge 14 is a mounting 18 for a rotary transfer device 20.

Figure 4:
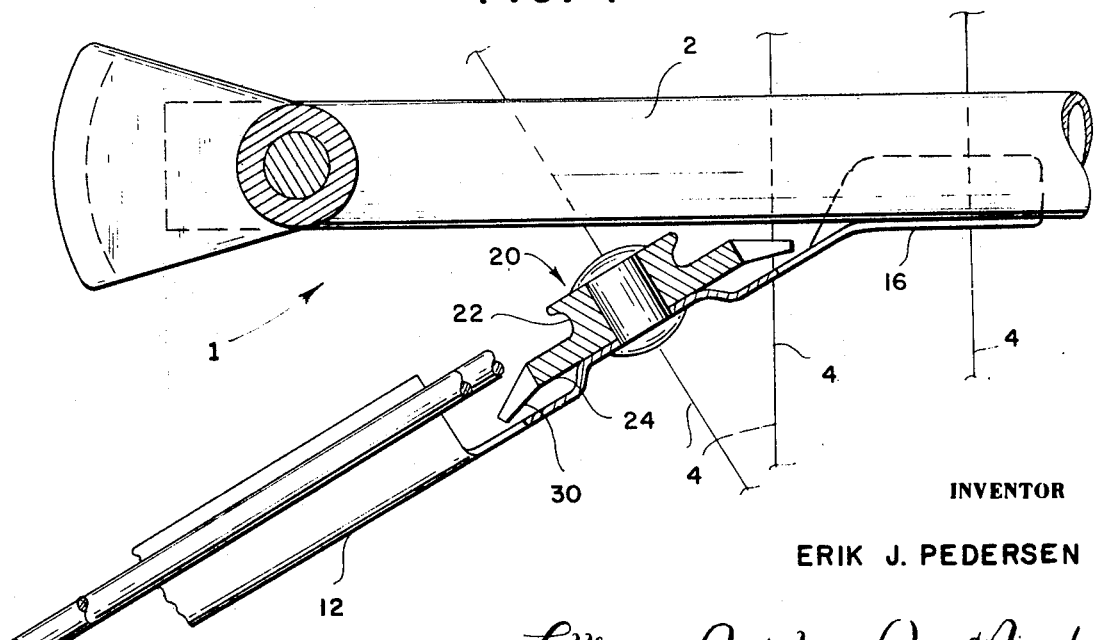
FIG. 4 is a top plan detail showing the transfer apparatus in partially cutaway view.

As shown in FIGS. 2, 3 and 4, transfer device 20 is a wheel, one portion of which is a pulley 22. Another axial portion of the wheel, a toothed device 24, has teeth 26 inclined with respect to radii of the wheel, so that the teeth 26 are parallel to bar 2 of carrier 1 as shown in FIG. 4.

As best seen in FIG. 2, transfer wheel 20 rotates in a direction shown by arrow 28. The forward faces 30 of the teeth have reverse curves to aid in the lifting and the depositing of hangers 4. Convex base portion 32 of the curved tooth face 30 insures that the hangers 4 will not slip off the face as they are being lifted from bar 2. Convex outer portions 34 on the leading faces 30 of teeth 26 insure that the hangers will be released onto the second conveyor.

A continuous belt 40 moves in a direction 42 along a trough 44 formed in an upper edge of the frame. Belt 40 is exposed along the upper side of the frame to receive and carry hangers 4 along the second conveyor. As best shown in FIG. 4, belt 40 passes around pulley 22 to drive the rotary transfer device 20.

In operation, hangers 4 are carried on bar 2 of carrier 1. The carrier is driven along track 5 adjacent a discharge station where the identification of indicia-carrying devices 7 is sensed. When an appropriate identification is sensed, arm 12 is swung into contact with bar 2. Carrier 1 keeps moving, and guide 16 aligns hangers on bar 2 so that the loops of the hangers are in position to be engaged by teeth 26 of transfer device 20. The transfer device lifts the hangers from bar 2 and positions the hangers over belt 40 before lowering the hangers thereon. Belt 40 then carries the hangers away from transfer wheel 20.

Although this invention has been described in part by specific embodiments, it will be obvious to those skilled in the art that several modifications may be made without departing from the invention. In one modification of the method, for example, the apparatus of this invention may be driven in reverse to move hangers along belt 40 toward carrier 1, and to transfer the hangers with rotary transfer 20 to bar 2 of carrier 1. The scope of the invention is defined only in the following claims:

That which I claim is:

1. Automatic hanger discharge apparatus comprising a second conveyor means positionable adjacent a first conveyor means, rotary transfer means connected to the second conveyor means for lifting hangers from the first conveyor means and depositing hangers on the second conveyor means, and guide means connected to the second conveyor means in the extension thereof beyond the rotary transfer means for contacting the first conveyor means and for positioning hangers on the first conveyor means for lifting by the rotary transfer means, driving means for moving the second conveyor means and rotating means for operating the rotary transfer means.

2. The automatic hanger discharge of claim 1 wherein the second conveyor means further comprises a hinge means whereby an end of the conveyor means having the extension means and rotary transfer means may be positioned adjacent the first conveyor means and may be alternatively swung away from the first conveyor means.

3. The automatic hanger discharge apparatus of claim 1 further comprising propulsion means moving the first conveyor means with respect to the guide means, thereby bringing hangers into contact with the guide means and with the rotary transfer means.

4. The automatic hanger discharge apparatus of claim 1 wherein the guide means extends beneath the first conveyor means to engage vertical dependent portions of hangers, and wherein the guide means extends partially around one side of the first conveyor means and extends outward therefrom to reorient hangers toward the transfer means and away from a free gravitationally suspended position on the first conveyor means.

5. The automatic hanger discharge apparatus of claim 1 wherein the second conveyor means comprises a frame and a continuous flexible member mounted for movement along frame, exposed along an upper surface of the frame, and being driven with respect to the frame, with a portion of the flexible member moving along an upper surface of the frame moving away from the first conveyor means.

6. The automatic hanger discharge apparatus of claim 5 wherein the rotary transfer means comprises a wheel mounted for rotation on the frame, the wheel having a pulley portion and a toothed portion, and the flexible member being passed around the pulley portion whereby the flexible member drives the rotary transfer means.

7. The automatic hanger discharge apparatus of claim 6 wherein the toothed portion of the wheel defines teeth which are angularly disposed with respect to radii of the wheel, the teeth having curved forward faces which facilitate the lifting of hangers from the first conveyors, the holding of hangers during transfer and the depositing of hangers on the flexible member.

8. The automatic hanger discharge apparatus of claim 5 wherein the frame defines a unitary element being curved and troughed adjacent an upper portion thereof to support the flexible member, being configured to rotatably support the rotary transfer means and integrally extending beyond the transfer means and being bent and curved to lie parallel to the first conveyor means and to partially surround that means.

9. The method of transferring hangers from a first conveyor to a second conveyor comprising positioning a guide means and a rotary transfer means at the end of a second conveyor and adjacent a first conveyor, moving the first conveyor with respect to the guide means, transfer means and second conveyor, moving a continuous flexible member along a second conveyor, rotating the transfer means with the continuous member, moving hangers on a first conveyor along the guide means onto the rotary transfer means, lifting hangers from the first conveyor with the rotary transfer means and depositing hangers on the continuous flexible member and moving hangers thereon away from the first conveyor.